N. CARO.
PROCESS OF OBTAINING AMMONIUM SULFATE FROM GASES.
APPLICATION FILED JUNE 28, 1909.
952,560.
Patented Mar. 22, 1910.
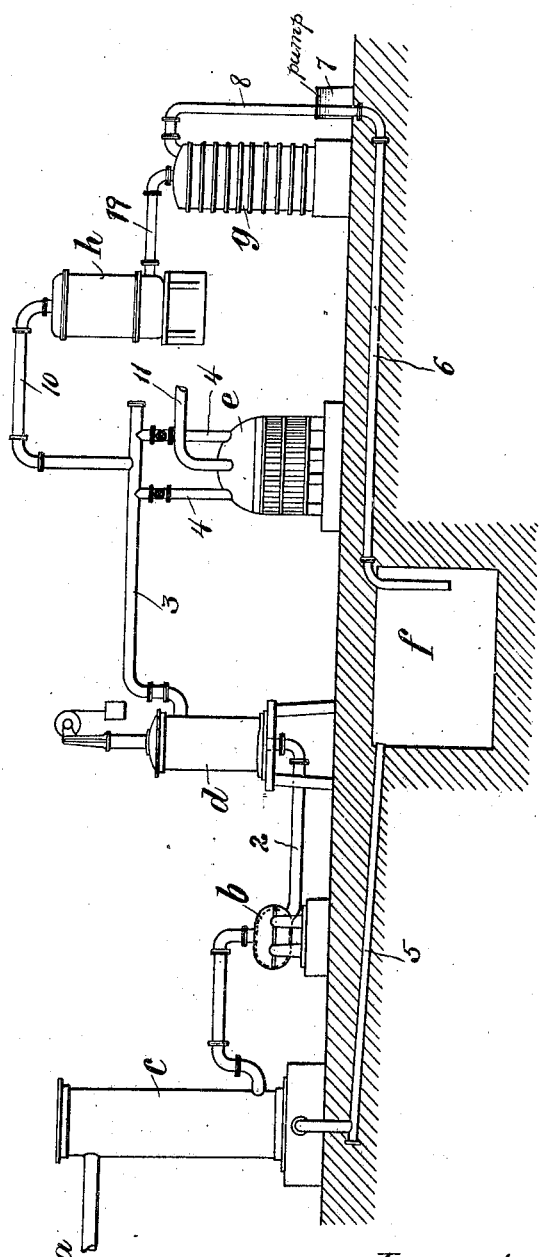
Witnesses
C. V. Sommers
M. T. Ellis
Inventor
Nikodem Caro
by Henry Orth
Atty

UNITED STATES PATENT OFFICE.

NIKODEM CARO, OF BERLIN, GERMANY, ASSIGNOR TO GEWERKSCHAFT DER STEIN-KOHLENZECHE MONT. CENIS, OF SODINGEN, GERMANY.

PROCESS OF OBTAINING AMMONIUM SULFATE FROM GASES.

952,560.  Specification of Letters Patent.  Patented Mar. 22, 1910.

Application filed June 28, 1909. Serial No. 504,818.

*To all whom it may concern:*

Be it known that I, NIKODEM CARO, a subject of the King of Prussia, residing at 20 Meinekestrasse, Berlin, Germany, have invented certain new and useful Improvements in Processes of Obtaining Ammonium Sulfate from Distillation-Gases; and I do hereby declare the following to be a full, clear, and exact description of the invention.

The subject matter of my invention relates to a process of obtaining ammonium sulfate from distillation gases, especially from such gases as are produced in coke ovens, gas producers, retorts and the like.

Heretofore sulfate of ammonia has been obtained from distillation gases, especially from gases of coke and gas plants, by washing out the ammonia contained in the gases with water, conducting the ammonia water into distillation columns and utilizing the ammonia derived therefrom for the manufacture of sulfate. Attempts have been made to remove the ammonia from the distillation gases directly by means of sulfuric acid, but such methods were objectionable for the following reasons: If the ammoniacal distillation gases were passed into concentrated sulfuric acid, it is true that a solid salt, ammonium sulfate, was obtained, but there was also a severe action of the sulfuric acid on the gases themselves which occasioned the liberation of tar in a troublesome manner; if the absorption solution contained but little free acid, however, there was no separation of tar, but there was also no deposition of salt, so that the lye obtained had to be evaporated for the purpose of obtaining the salt, which operation entailed great expense.

Now according to a known process a relatively slightly concentrated absorption lye containing sulfuric acid is employed, but in order to directly crystallize out the salt, it is necessary to prevent the steam contained in the gases from condensing and to this end the gases are superheated again, after the separation of tar and steam, and before they pass into the absorption solution. According to the statement of the inventor of said process, this superheating of the gas not only prevents the condensation of the steam contained in the gases, but also prevents any further dilution of the absorption lye owing to steam condensing, when the ammonia saturated with steam is simultaneously conducted thereto from the ammonia columns that work up the ammonia water which condensed during the cooling operation of the gases. Practical experience with this process has shown, on the one hand, that the superheating of the gases before their introduction into the absorption lye necessitates a particularly troublesome apparatus and, on the other hand that this superheating does not suffice to prevent the condensation of the aqueous vapor which comes simultaneously from the ammonia columns into the lye; consequently in this process there is either a continuous dilution of the absorption lye, so that no solid salt is deposited, or the superheating must be driven so far that the sulfate of ammonia is decomposed, this being noticeable at 90° C.

Now the object of my invention is to remedy these defects. According to my invention the troublesome superheating of the gas is omitted, on the one hand, and on the other hand, solid salt is constantly deposited whereby the ammonia absorbed from the distillation gases and also that ammonia which is obtained from the distilling column from the ammonia water condensed when the gases cool is bound in one single absorption vessel. The distillation gas is cooled to a temperature of 15° to 20° C. and thus liberated from the tar, and simultaneously a part, about 1/5 of the ammonia contained in the gas, is separated with the water of condensation forming ammonia water. The ammoniacal, cooled gas is now passed without further heating into a solution of sulfate of ammonia, preferably into one of about 29°–35° Bé. which contains a small percentage, up to about 5%, of free sulfuric acid. That gas which is obtained by working up the ammonia contained in the condensed water, is simultaneously led with the cooled gas, but in a concentrated state, into this solution. In this manner the formation of solid salt in the absorption lye is obtained without the lye becoming diluted. When supplying the concentrated ammonia gas to the absorption lye the heat produced by the chemical action of ammonia on sulfuric acid suffices for preventing the vapor from the distillation gas and also from the ammonia distilling column from condensing without any special devices for superheating the mixture of steam and ammonia being necessary.

The concentrated ammonia gas is preferably obtained from the gases of the ammonia column apparatus in the usual manner by passing these waste gases through a cooler or condenser and cooling them from 40° to 60° C. In this manner not only is the ammonia gas concentrated, but also steam is separated so that this no longer prejudicially influences the concentration of the absorption lye. I therefore, obtain a solid salt, free from tar, from the absorption lye and when the gas is worked up according to my process, ammonia washers are done away with, the work in the ammonia works is reduced by about 75%, and the quantity of waste water is diminished by 75%.

In order that my invention may be more fully understood I will describe the same in connection with the accompanying drawing illustrating the apparatus for carrying out my novel process in elevation and partly in section.

The gases from a coke oven, gas retort or similar apparatus, not shown, are drawn through pipe $a$ and a cooler $c$, of any suitable construction by a pump $b$ which pump at its forcing side is connected by a pipe 2 to a tar separator $d$ of any well known construction. From the tar separator the cooled gas passes through pipes 3 and 4 to the absorption device $e$ also of any suitable and well known construction which contains the described acidulated ammonium sulfate solution. The condensates from the cooler $c$ pass by pipe 5 to a reservoir $f$ and are taken from here by pipe 6 and pump 7 or any other suitable means, and forced through pipe 8 to the distilling column $g$. The vapors from column $g$ being a mixture of water-vapor and ammonia, pass by pipe 19 to the cooler $h$ of any suitable construction, are partially dried and then pass by pipe 10 into the absorption device $e$ simultaneously with the dried distillation gases. The condensate in cooler $h$ returns by pipe 19 to the ammonia still $g$.

The crystallized product is continually removed from $e$ either by hand or mechanically. The ammonia freed gas passes from the absorber $e$ by pipe 11.

I claim:—

1. The process of obtaining solid ammonium sulfate from ammoniacal distillation gases which comprises cooling the gases to separate from them tar and ammonia water, distilling the ammonia water, partially drying the vapors therefrom and mixing them with the previously cooled distillation gases and conducting the mixture into a solution containing ammonium sulfate and sulfuric acid.

2. The process of obtaining solid ammonium sulfate from ammoniacal distillation gases which comprises cooling the gases to separate from them tar and ammonia water, distilling the ammonia water, separating water from the resulting vapors and simultaneously conducting these vapors with the previously cooled distillation gases into a solution of ammonium sulfate containing about five percentum of sulfuric acid and of from twenty-nine to thirty-five degrees Baumé in strength.

In testimony that I claim the foregoing as my invention, I have signed my name in presence of two subscribing witnesses.

NIKODEM CARO.

Witnesses:
  HENRY HASPER,
  WOLDEMAR HAUPT.